June 15, 1965 G. V. PATSER 3,189,741
GONIOSTAT
Filed Sept. 6, 1963 6 Sheets-Sheet 1

Fig. 1

INVENTOR.
George V. Patser
BY Watts & Fisher
ATTORNEYS.

Fig. 2

June 15, 1965  G. V. PATSER  3,189,741
GONIOSTAT
Filed Sept. 6, 1963  6 Sheets-Sheet 3

Fig. 3

INVENTOR.
George V. Patser
BY Watts & Fisher
ATTORNEYS.

June 15, 1965  G. V. PATSER  3,189,741
GONIOSTAT
Filed Sept. 6, 1963  6 Sheets-Sheet 4

INVENTOR.
George V. Patser
BY *Watts & Fisher*
ATTORNEYS.

United States Patent Office 3,189,741
Patented June 15, 1965

3,189,741
GONIOSTAT
George V. Patser, Willowick, Ohio, assignor to Picker X-Ray Corporation, Waite Manufacturing Division, Inc., Cleveland, Ohio
Filed Sept. 6, 1963, Ser. No. 307,163
14 Claims. (Cl. 250—51.5)

This invention relates to apparatus using X-rays for the non-destructive analysis of specimens and more particularly to a device known in the art as a goniostat.

Certain scientific studies use a device known as a diffractometer. A diffractometer has a rotatable element known alternately as a theta or omega element which, in many types of studies, supports a specimen for rotation about the axis of the omega element. An X-ray tube is suitably positioned to bombard the specimen with a collimated beam of X-rays. A detector such as a scintillation probe is positioned on another rotatable element known as a two theta element. Normally, and in the usual tests, this detector is positioned in the path of rays diffracted by the specimen and rotated at a rate twice that of the specimen so that the detector is maintained in the path of the diffracted rays.

With certain types of studies it is desirable to rotate the specimen not only about the omega axis but also about two other axes shown as the chi and phi axes. The chi axis is an axis which is normal to the omega axis and intersects the omega axis at a point where the specimen is located. The phi axis is a third axis which is normal to the chi axis and which also intersects the other axes at the same point. One type of apparatus used to perform studies of this type is known in the art as a goniostat. The present invention is directed to an improved goniostat.

The goniostat of this invention is mounted on the omega member of diffractometer. Preferably, the diffractometer used in combination with the goniostat of this invention is that described and claimed in United States patent application Serial No. 236,468, filed November 2, 1962, by Thomas C. Furnas, Jr. The goniostat of this invention provides, when used in combination with that diffractometer, full 360° rotation about each of the three described axes independent of, if desired, the so-called "two theta" motion.

While previous attempts have been made at providing 360° rotation about all three axes, the previous attempts have had inherent short-comings. No previous attempt has provided a device wherein chi, phi, and omega inputs and outputs could be connected to a computer so that control of the inputs and recording of the outputs can be had while the facility and flexibility of full 360° of all three rotations was obtained. One of the features of this invention is a structure which permits such coupling to a computer while maintaining the described flexibility of rotation.

With the present invention an annular chi worm gear is provided that is endlessly rotatable about the chi axis. This axis, when for example the omega axis is vertical, horizontally intersects the omega axis. The chi worm gear carries a phi head. The phi head provides rotation of the specimen about the third axis, the phi axis.

The phi head carries a conventional goniometer head which supports the specimen. The specimen is positioned around the point where the three axes intersect for rotation about each of the three intersecting axes or coordinants.

As will become apparent from a full reading of this disclosure, one problem that is presented where rotation for 360° about each of these three axes is provided, is that the phi rotation is effected by chi rotation. With the present invention, a unique system is provided for coupling a phi odometer or other recording device to the rotating elements so that true phi rotation is accurately recorded whether it is occasioned by rotation of the chi worm gear, a phi ring gear, or both.

This unique recording of phi rotation is obtained through a gearing system and a differential, the output of which is connected to a phi odometer or other phi recording mechanism. Thus, another feature of the mechanism is a construction which permits very accurate control of phi and chi inputs and very accurate control and recording of the outputs.

Another feature of this invention is that the gear trains which produce the phi and chi rotations can be disabled to permit manual positioning of the specimen. For example, the phi and chi gear trains can be broken and the specimen can be manually moved while studied with a microscope until it is positioned precisely where the scientist wishes to have it. At this time the gear trains can be enabled by reconnecting the previously disengaged gears and the device is set for study. To further facilitate use of the device, very accurate position indicating mechanisms are provided so that either or both of the phi and chi rotation systems can be disabled for manual positioning and thereafter the rotation mechanisms can be accurately reconnected to the identical position or to a position of a known angular displacement from the position of the mechanism prior to the disabling.

Accordingly, the object of this invention is to provide a novel and improved goniostat and a process for using such a goniostat.

Other objects and a fuller understanding of the invention may be had by referring to the following description and claims taken in conjunction with the accompanying drawings in which:

Figure 1:
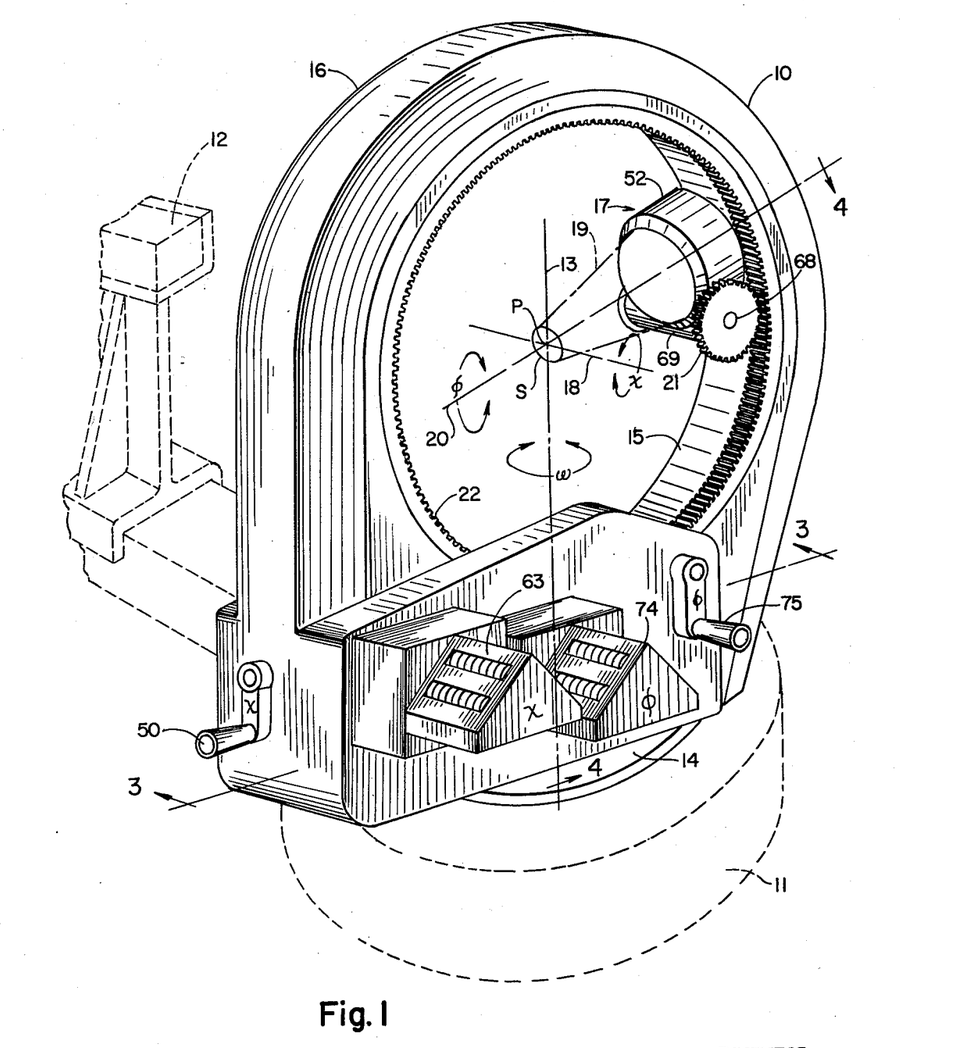
FIGURE 1 is a perspective view of the goniostat of this invention showing, in schematic form, a connected diffractometer.
Figure 2:
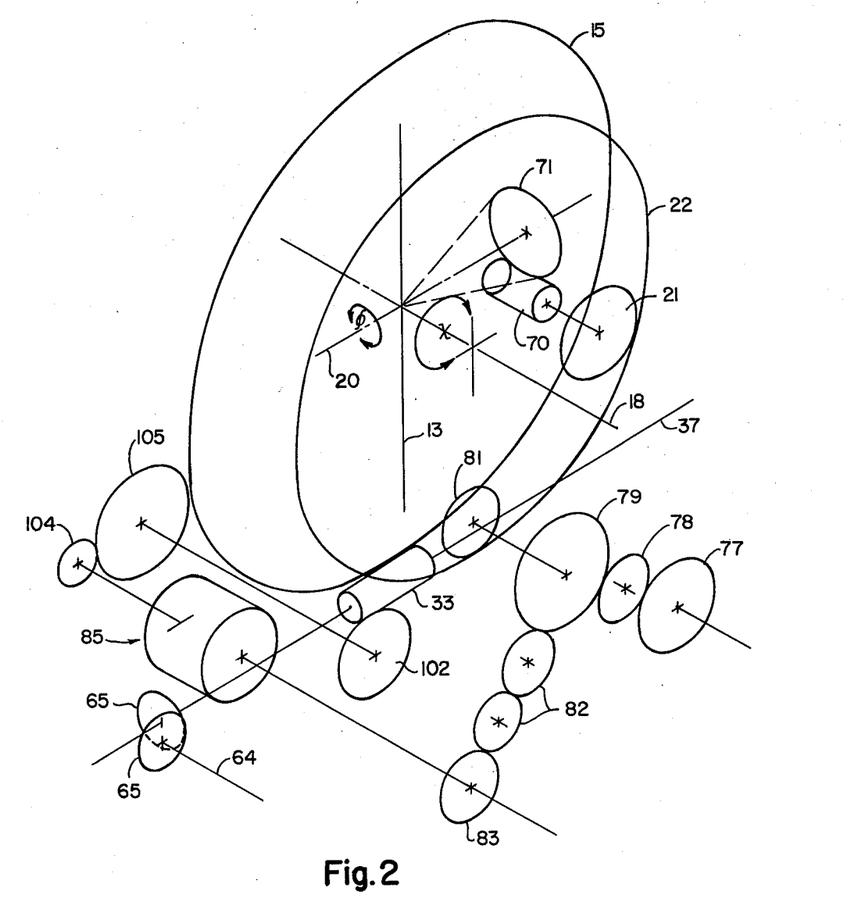
FIGURE 2 is a schematic drawing showing the gear train of the goniostat of FIGURE 1.

Referring to the drawings and FIGURE 1 in particular, the improved goniostat of this invention is shown generally at 10. The goniostat is mounted on the omega element of a diffractometer shown schematically in phantom at 11. The diffractometer is preferably a diffractometer of the type described and claimed in co-pending patent application Serial No. 236,468, filed November 2, 1962, by Thomas C. Furnas, Jr., entitled diffractometer. The so-called "omega element" referred to above, is the rotatable specimen support of a diffractometer which rotates through an angle known in the art as the omega angle.

The goniostat 10 of this invention is preferably used with the diffractometer referred to in the above-referenced application because the omega motion may be obtained independently of the so-called "two theta" motion; i.e., the rotation of a detector 12 about the axis of the omega motion. In the disclosure in FIGURE 1, the omega axis is vertical and designated by the line 13.

The goniostat 10 has a housing 16 equipped with a mounting 14 secured to the diffractometer. An annular, externally toothed, chi worm gear 15 is journaled in the housing 16. A phi head 17 is secured to the chi worm gear 15 to rotate with it about a horizontal axis known as the chi axis and designated by the numeral 18. The chi axis intersects and is perpendicular to the omega axis at a point P where a specimen shown schematically as S is positioned. The specimen S is suitably connected to the phi head 17 by a goniometer head shown in phantom at 19. The goniometer head 19 and the specimen S are carried by the phi head 17 for rotation about a third axis 20 known as phi axis. Rotation of the specimen about the phi axis is selectively provided through a pinion 21 and a ring gear 22 in a manner which will be described in greater detail below.

*The chi mechanism*

Figure 3:
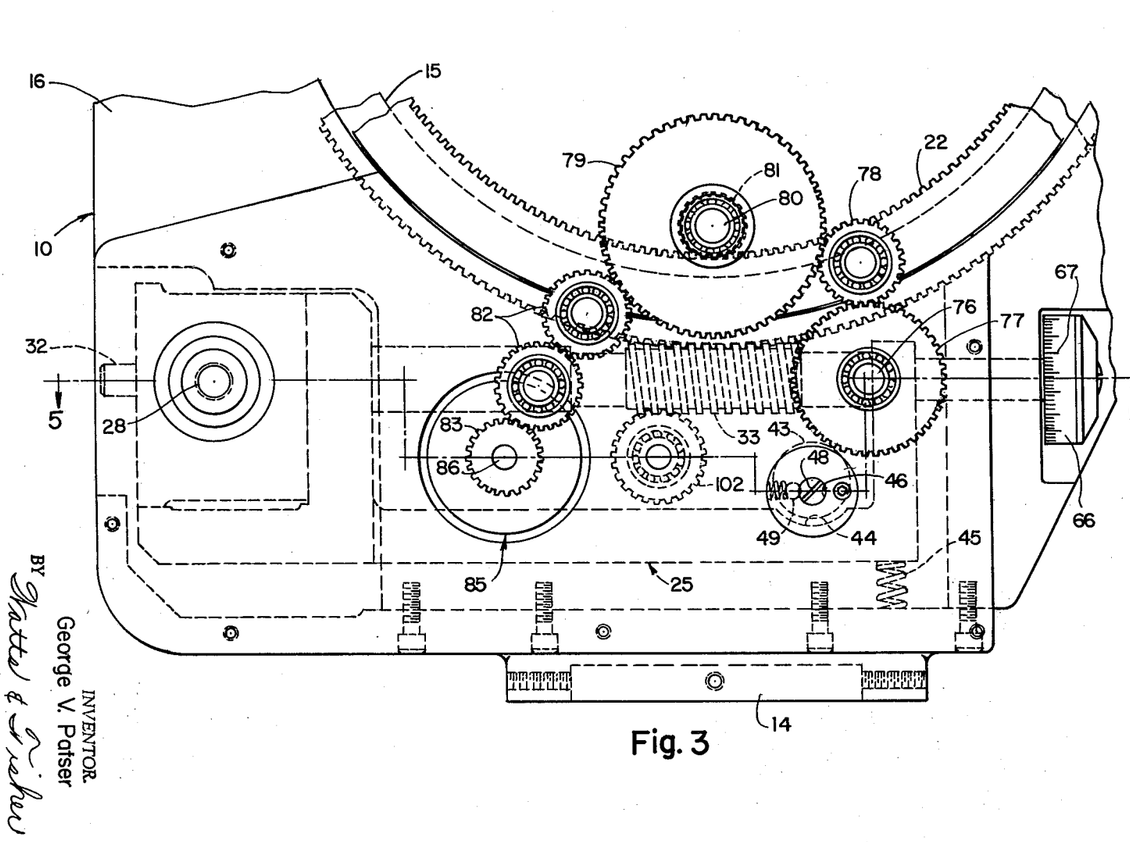
FIGURE 3 is a sectional view of portions of the goniostat on an enlarged scale with respect to FIGURE 1 and as seen from the planes indicated by the line 3—3 of FIGURE 1.
Figure 5:
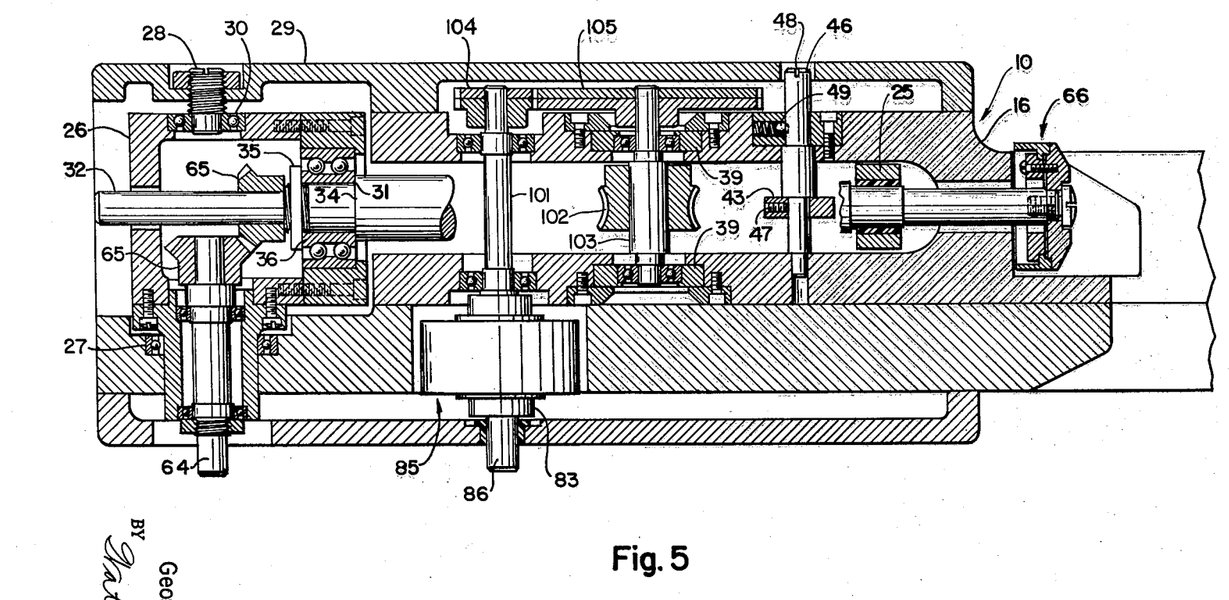
FIGURE 5 is a sectional view as seen from the planes indicated by the line 5—5 of FIGURE 3 and on the scale of FIGURE 3.

The housing 10 has a gear saddle 25 mounted in it. The gear saddle 25 has an internal housing portion 26 at one end, the left hand ends as is seen in FIGURES 3 and 5. The internal housing portion 26 is journaled at 27 in the housing 10. A saddle support pin 28 is in axial alignment with the journaling 27 and mounted in a housing cover plate 29. The internal housing portion 26 is journaled at 30 on the saddle support pin 28. The saddle 25 is rotatable about the axially aligned journalings at 27, 30.

The saddle 25 carries a chi input shaft 32. The chi input shaft is journaled in the saddle for relative rotation. The chi input shaft 32 carries a chi worm 33 which selectively engages the chi worm gear 15 to produce the chi rotation. Preferably the chi worm 33 and the worm gear 15 are pitched to produce 1° of chi rotation for each revolution of the worm.

The chi input shaft 32 is located axially by a combination journaling and thrust roller bearing 31 which is carried in the internal housing portion 26, FIGURE 5. The shaft 32 has a shoulder 34 which abuts one face of the inner race 36 of the bearing 31. A nut 35 is threaded onto the shaft 32 and abuts the inner race 36 to fix the bearing and the shaft 32 against relative axial motion.

Figure 4:
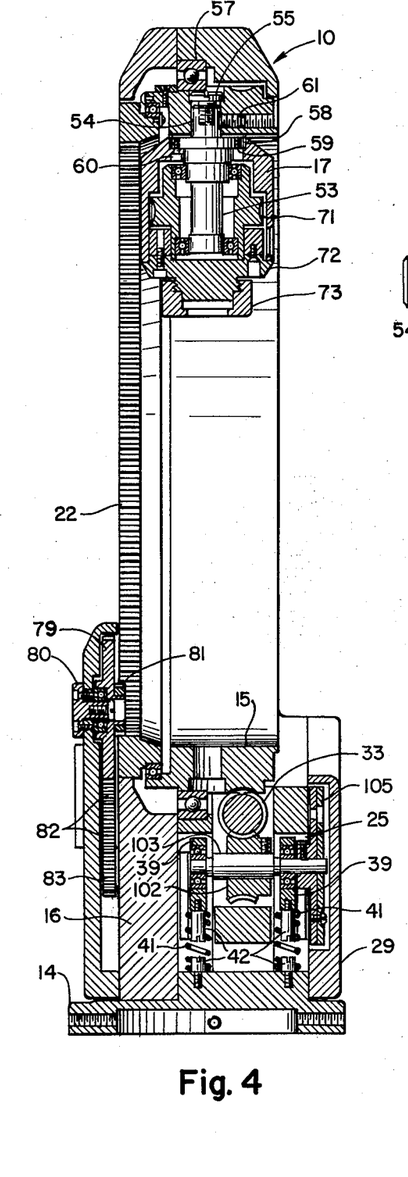
FIGURE 4 is a sectional view, as seen from the planes indicated by the line 4—4 of FIGURE 1, on an enlarged scale with respect to FIGURE 1, and showing the phi head positioned symmetricaly about the axis of the line 4—4 of FIGURE 1.

The saddle 25 is biased upwardly by a pair of springs 41 which surround suitable locating dowels 42 mounted on gear support slides 39 and the housing 10, FIGURE 4. The slides 39 will be more completely described below. Vertical positioning of the saddle 25 and structure carried by it is controlled by an eccentric 43, FIGURE 5, against the action of the springs 41 and a spring 45 between the saddle 25 and the housing 10. The eccentric 43 acts against a cam surface 44, FIGURE 3, on the saddle 25 to selectively pivot the saddle 25 about the axes of the journalings 27, 30. The eccentric 43 is mounted on an eccentric control shaft 46 and secured to it as by a set screw 47. The eccentric control shaft 46 is equipped with a slot 48 for receiving a screwdriver or other suitable rotation producing tool. A spring loaded ball detent 49 acts against suitable recesses in the eccentric shaft 46 to maintain the eccentric 47 selectively in a position depressing the saddle 25 or in an operating position wherein the springs 41 bias the worm 33 into engagement with the worm gear 15. The purpose of the eccentric is to permit the chi worm gear 15 to be disconnected from the chi worm gear 15. This disconnection permits manual rotation of the specimen S about the chi axis to a suitable and selected position.

In the disclosure of FIGURE 1, a chi input handle 50 is shown. The chi input handle permits manual drive of the chi rotation. As will become more readily apparent from a full reading of this disclosure, the goniostat of this invention is designed for use with power drives, especially computer controlled power drives. Thus, while a manual input handle 50 is shown, it should be recognized that the unit is designed for convenient use with a computer controlled system while at the same time permitting full 360° chi and phi rotations.

Referring now to FIGURE 4, the phi head 17 has a housing 52 mounted on a spindle 53. The spindle 53 includes a reduced diameter mounting end portion 54 which extends into a radially disposed bore in the chi worm gear. An anchoring screw having a head 55 is threaded into the end of the reduced diameter portion 54 to fix the spindle 53 to the chi worm gear. The anchoring screw head 55 is positioned within a counterbore 56 in the chi worm gear so as to avoid interference with a worm gear support bearing 57.

The spindle 53 includes an outwardly extending positioning shoulder 58 which carries suitable adjustment screws 59, only one of which is shown. The adjustment screws 59 selectively act against the inner surface of the chi worm gear 15 to locate the spindle 53 at an appropriate position along its axis. The shoulder 58 carries suitable bolts 60, only one of which is shown, which fix the phi head housing 52 to the shoulder 58 and thus to the spindle 53. The spindle 53 and the connected phi head housing 52 are fixed against rotation about the axis of the spindle 53 as by a set screw 61 which threads into the chi worm gear 15 and acts against a flat on the reduced diameter portion 54.

A chi odometer 63 is provided, FIGURE 1. The chi odometer 63 is provided to give an indication of the amount of chi rotation which has occurred during a given study. The chi odometer 63 is driven by an odometer shaft 64 which is journaled in an extension of the internal housing portion 26. The chi odometer shaft 64 is positioned along an axis which is co-axial with the axes of the saddle journalings 27, 30. Bevel gears 65 are secured to the chi input shaft 32 and the chi odometer shaft 64. The bevel gears 65 are in meshing engagement so that rotation of the odometer input shaft 32 causes simultaneous rotation of the odometer shaft 64.

A calibrated chi indicating head 66 is secured to the end of the chi input shaft 32 remote from the handle 50. The calibrated chi head 66 preferably has 100 graduations 67. These, together with a witness mark, not shown, on the housing 10 provide visual indication of chi position to 0.01 of a degree.

*The phi rotation*

The phi rotation pinion gear 21 is mounted on a phi rotation input shaft 68. The phi rotation input shaft 68 is journaled in a phi housing extension 69. A phi rotation worm 70 is fixed to the phi rotation input shaft 68. The phi rotation worm 70 meshes with a tubular worm gear 71 within the phi housing 52 and journaled on the spindle 53. Thus, rotation of the phi rotation pinion 21 will cause rotation of the tubular worm gear 71. Rotation of this tubular worm gear 71 will cause rotation of a connected specimen support end member 72 which in turn will cause rotation of the goniometer head 19, secured to it by an annular cap 73.

An analysis of the disclosure will show that there are two occurrences which can occasion phi rotation of the specimen S. Rotation of the annular worm gear 15 while the internal ring gear 22 is held stationary will cause phi rotation because the worm gear rotation will cause the phi pinion gear 21 to orbit while meshed with the ring gear 22. Similarly, rotation of the ring gear 22 while the worm gear 15 is held stationary will cause the pinion 21 to rotate and cause phi rotation. Obviously, if both the worm gear 15 and the pinion gear 22 are rotating at the same time, the phi rotation will be some function of the relative speeds and it can be zero if the speeds are appropriately selected. One of the outstanding features of this invention is that a structure is provided wherein phi rotation occasioned by either the chi worm gear 15 or the phi ring gear 22 is recorded on a phi odometer 74 and this odometer 74 will record total phi rotation even if it is a rotation obtained when both the worm gear 15 and the ring gear 22 are rotated. The structure which drives the odometer will be described in greater detail below.

Rotation of a phi input handle 75 will cause, through a structure which will be described presently, rotation of the ring gear 22. As in the case of the handle 50, the handle 75 is pictured to show manual operation but again computer drive and control are preferably used. Similarly, the outputs, recorded in the disclosed embodiment in the chi and phi odometers 63, 74, are preferably delivered to a computer for suitable recording, calibration, analysis, and the like.

The phi input handle 75 is secured to a phi input shaft 76, FIGURE 3. A phi input pinion 77 is fixed to the input shaft 76 and it drives an idler spur gear 78. The idler spur gear 78 drives a drive gear 79. The drive gear 79 is a spur gear journaled on a stud 80. A phi drive gear 81 is secured to the drive gear 79 and meshed with the ring gear 22. Thus, rotation of the handle 75 will, through gears 77, 78, 79, 81, drive the ring gear 22.

A pair of idler spur gears 81 are in engagement with one another and driven by the drive gear 79. These idler gears 82 mesh with a phi differential input gear 83 for a purpose described below.

Figures 6, 7:
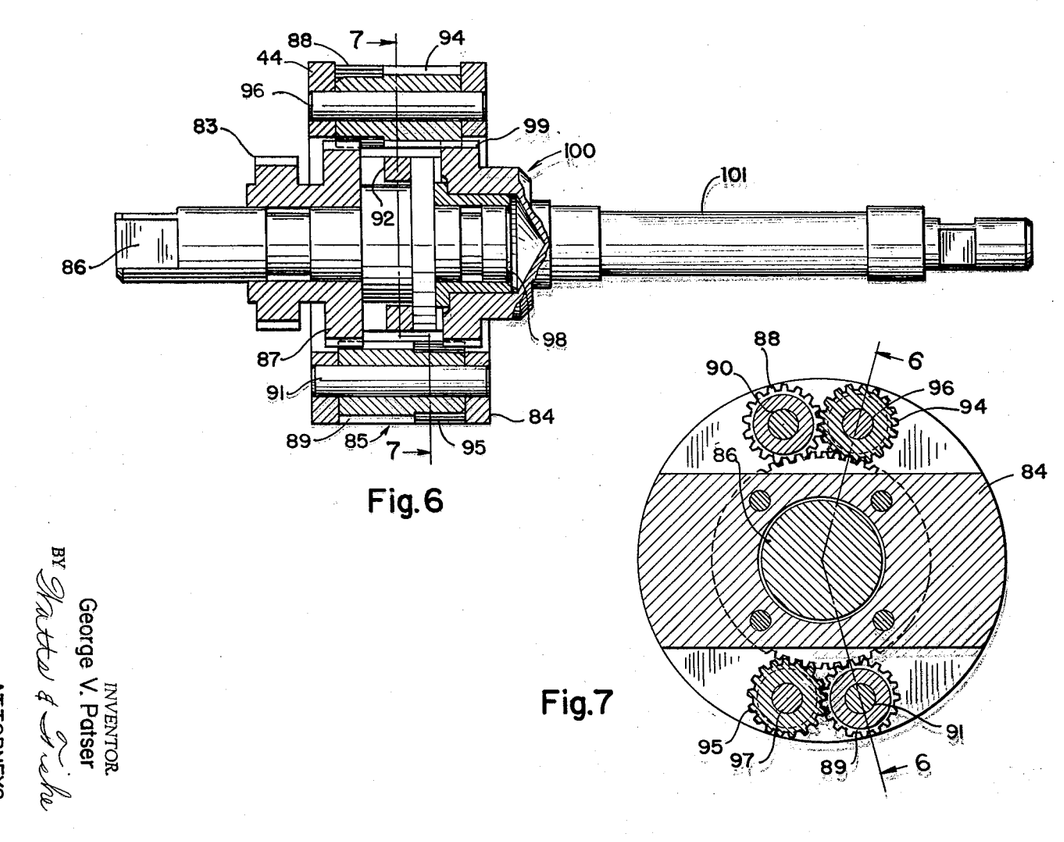
FIGURE 6 is a sectional view of a differential on an enlarged scale with respect to FIGURES 1–5 and as seen from the planes indicated by the line 6—6 of FIGURE 7.
FIGURE 7 is a sectional view of a differential on the scale of FIGURE 6 and as seen from the planes indicated by the line 7—7 of FIGURE 6.

A phi odometer drive differential shown generally at 85 is mounted in the housing 10, FIGURE 5. The details of the differential are shown in FIGURES 6 and 7. The differential includes a housing 84. The housing 84 has a transverse central web 92. A phi odometer drive shaft 86 is fixed to the web 92 and projects outwardly to the left as seen in FIGURE 6. The differential drive gear 83 is journaled on the phi odometer drive shaft 86 for relative rotation. The differential drive gear 83 includes an integrally formed pinion gear drive portion 87 which meshes with spaced differential pinions 88, 89. The differential pinions 88, 89, are mounted on shafts 90, 91, carried by the differential housing 84 near its periphery. A second pair of differential pinions 94, 95, are respectively carried on differential pinion shafts 96, 97, and respectively mesh with the differential pinions 88, 89.

As noted previously, rotation of either the phi ring gear 22 or the chi worm gear 15 can effect phi rotation. The purpose of the differential is to feed to the phi odometer 74, total phi rotation occasioned by rotation of either the chi worm gear 15, phi ring gear 22, or both.

The rotational force supplied to the differential 85 by the differential drive gear 83 is, as has been described above, provided when the phi ring gear 22 is rotated. A second differential input gear 99, is provided and is connected to the differential pinions 94, 95. The second differential input gear is integrally formed on a tubular end portion 100 of another differential input shaft 101. The tubular portion 100 is journaled on an extension 98 of the phi odometer drive shaft 86. The input shaft 101 is journaled in the saddle 25, FIGURES 4 and 5.

A worm component worm gear 102 is positioned below the worm 33 and in meshing engagement with it. The worm gear 102 is secured to a supporting shaft 103 which is journaled in the gear support slides 39, FIGURES 4 and 5. Thus, the worm gear 101 is mounted such that when the worm 33 is lowered by the action of the eccentric 43, the worm gear and slides 39 will slide vertically with the worm against the springs 41. The input shaft 101 and the worm gear support shaft 103 carry meshing pinions 104, 105, respectively. Accordingly, rotation of the chi input shaft 32 will cause rotation of the second differential input gear 99 through the connection afforded by worm gear 102, its shaft 103, the meshing pinions 104, 105, and the input shaft 101.

If the chi worm gear 15 is stationary, the second input gear 99 will be stationary. Rotation at this time of the phi ring gear 22 will cause rotation of the differential input gear 87. Since the input gear 99 is stationary, rotation of the input gear 87 will cause rotation of the differential housing 84 and, therefore, of the connected phi odometer shaft 86. Conversely, if the phi ring gear 22 is stationary, rotation of the chi worm gear 15 will cause, through the second differential input gear 99, rotation of the differential housing 84 and, therefore, of the phi odometer 86.

The gear sizes are selected such that the rotation of the phi odometer shaft 86 exactly corresponds to the rotation of the goniometer head 19 and, therefore, of the specimen S. It will be apparent that if both the chi worm 15 and the phi ring gear 22 are rotating, rotation of both the goniometer head 19 and the phi odometer input shaft 86 will be a function of the rotation of the gears 15, 22.

Figure 8:
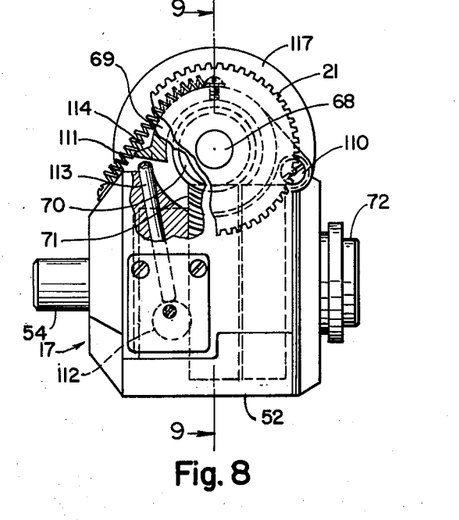
FIGURE 8 is a side elevational view of the phi head with parts broken away and removed to show portions of the internal construction of the phi head.
Figure 9:
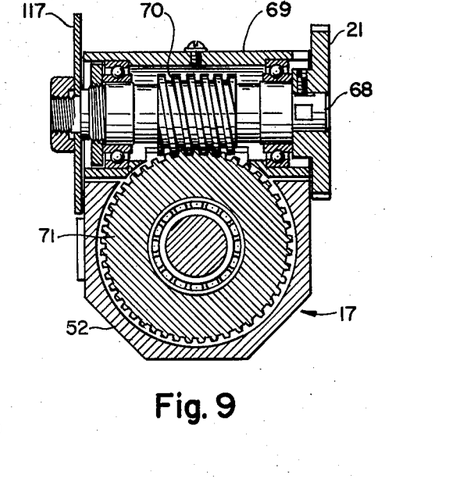
FIGURE 9 is a sectional view of the phi head as seen from the line 9—9 of FIGURE 8.

Referring now to FIGURE 8, the phi housing extension 68 is pivotally mounted on the phi housing 52 at 110. A spring 111 normally biases the phi housing extension 69 inwardly until the phi worm 70 is meshing with the tubular worm gear 71. A mechanism to disengage the worm 70 from the worm gear 71 is provided which is somewhat similar to the mechanism for disengagement of the worm and worm gear 33, 15.

The phi disengagement mechanism has a rotatable eccentric 112 mounted in the housing 52. The eccentric 112 acts against a housing extension positioning pin 113. The pin 113 abuts an ear 114 on the housing extension 69. Rotation of the eccentric 112 will selectively cause the pin 113 to move along its axis and act against the ear 114. Action of the pin 113 against the ear 114 causes pivoting of the housing extension 69 about the axis of the pivot 110 to selectively move the worm and worm gear 70, 71, into and out of engagement. This engagement is for convenience in manually positioning the goniometer head 19 to set up a study or for other purposes. In order that the phi position can be returned accurately and for other reasons, a calibrated disc 117 is secured to the end of the phi rotation input shaft 68 remote from the phi rotation pinion gear 21. The disc 117 preferably carries 100 calibrations (not shown) to coact with a witness mark on the phi housing 52 (not shown) providing visually observable indication of phi rotation to 100th of a degree.

Although the invention has been described in its preferred form with a certain degree of particularity, it is understood that the present disclosure of the preferred form has been made only by way of example and that numerous changes in the details of construction and the combination and arrangement of parts may be resorted to without departure from the spirit and the scope of the invention as hereinafter claimed.

What is claimed is:
1. A goniostat comprising:
 (a) an annular frame structure having a mounting member including means for securing the structure to a diffractometer or the like for rotation of the goniostat about an omega axis;
 (b) a chi rotating mechanism mounted on the structure and including a chi input member and an annular member journaled in the structure, said chi mechanism including means coupling the members, the annular member being rotatable about a chi axis substantially normal to the omega axis;
 (c) a phi rotating member mounted on the annular member for rotation about a third axis normal to the chi axis;

(d) a phi rotation producing power train carried by said structure and coupled to the phi member;

(e) phi and chi output shafts journaled in said structure, the output shafts each being rotatable about its own axis in response to rotation of the chi and phi mechanisms respectively but otherwise stationary with respect to said structure, said chi mechanism and said phi member each being spaced from said output shafts; and, (f) power transmission means coupling phi and chi output shafts respectively to the phi and chi mechanisms to cause rotation of the output shafts correlated to the rotation of the phi and chi mechanisms respectively.

2. A goniostat comprising:

(a) a housing having a base adapted to be mounted on an omega member of a diffractometer and an annular upstanding portion;

(b) an annular chi worm gear journaled in the upstanding portion and having worm gear teeth around the periphery thereof;

(c) a phi ring gear journaled in the upstanding portion and having inwardly directed teeth;

(d) a saddle pivotally mounted in the housing near said base and below said upstanding portion;

(e) a chi input shaft journaled in the saddle and carrying a chi worm selectively meshable with the chi worm gear to cause rotation thereof;

(f) a chi recorder drive output shaft journaled in the saddle and in driven engagement with said chi input shaft whereby the chi output shaft rotates whenever the chi input shaft rotates;

(g) a phi input shaft journaled in the housing, phi gearing coupling the phi input shaft to the ring gear to cause rotation of the ring gear whenever the phi input shaft rotates;

(h) a phi head rotatably mounted on the annular worm gear and including an internal tubular worm gear journaled for rotation about a phi axis;

(i) said phi head including a worm selectively engaging the tubular worm gear and mounted on a phi head shaft journaled in the phi head;

(j) a phi drive pinion mounted on the phi head shaft and in meshing engagement with the phi ring gear;

(k) eccentric positioning means coupled to the phi worm gear and the phi worm for selectively moving the two into and out of meshing engagement;

(l) a differential mounted in the housing near the base and having a phi recorder drive output shaft, said differential having an input side;

(m) first gearing coupling the input side of the differential to the phi ring gear;

(n) second gearing connecting the chi worm to the input side of the differential whereby rotation of either or both of the phi and chi input shafts will cause rotation of the phi recorder output shaft;

(o) eccentric means for positioning the saddle and thereby selectively connecting and disconnecting the chi worm and chi worm gear; and, (p) biasing means normally biasing the saddle into an operative position with the chi worm and chi worm gear meshed.

3. The device of claim 2 wherein chi and phi odometers are provided and coupled respectively to the chi and phi recorder drive output shafts.

4. A goniostat comprising:

(a) a support frame structure having a mounting member including means for securing the structure to a diffractometer or the like for rotation of the goniostat about an omega axis;

(b) a chi rotating mechanism mounted on the structure and including an input shaft and a chi rotating member journaled in the structure for rotation about a chi axis substantially normal to the omega axis;

(c) a phi rotating member mounted on the chi rotating member for rotation about a third axis normal to the chi axis;

(d) a phi rotation producing power train carried by the structure and coupled to the phi rotating member;

(e) phi and chi output shafts journaled in said structure, said output shafts each being rotatable about its own axis in response to rotation of the chi and phi mechanisms respectively but otherwise stationary with respect to said support structure, said chi mechanism and said phi member each being spaced from said output shafts; and, (f) power transmission means coupling the phi and chi rotating members respectively to phi and chi output shafts to cause rotation of the output shafts correlated to the rotation of the phi and chi rotating members respectively.

5. The device of claim 4 wherein the power transmission includes a differential coupled to the phi output shaft.

6. The device of claim 5 wherein said power transmission means coupling the chi rotating member and chi output shaft is a chi power train and wherein:

(a) said chi power train includes a chi worm;

(b) a worm gear is in engagement with said worm; and, (c) said worm is coupled to said differential.

7. A goniostat comprising:

(a) a housing having a base including means for mounting the base on a diffractometer or the like and an annular upstanding portion;

(b) an annular chi worm gear journaled in the upstanding portion and having outwardly oriented worm gear teeth;

(c) a saddle pivotally mounted in the housing near the base thereof and below the upstanding portion;

(d) a chi input shaft journaled in the saddle and carrying a chi worm selectively meshable with the annular worm gear to cause rotation thereof;

(e) a chi output shaft journaled in the saddle and in driven engagement with said input shaft whereby the output shaft rotates whenever the input shaft rotates;

(f) a phi head mounted on the annular worm gear and including portions rotatable about a phi axis normal to the chi axis;

(g) an eccentric movably mounted in said housing and coactable with the saddle for positioning the saddle and thereby selectively connecting the chi worm and chi worm gear;

(h) biasing means normally biasing the saddle into an operative position with the chi worm and worm gear engaged; and, (i) power train means including phi input and output elements and power transmitting means coupling the phi rotatable portions to the input and output elements.

8. A goniostat comprising:

(a) a housing having a base adapted to be mounted on an omega member of a diffractometer or the like and an upstanding portion;

(b) a chi member journaled in the upstanding portion for rotation about a chi axis;

(c) chi input and output elements journaled in the housing;

(d) first power train means coupling the chi elements to the chi member whereby rotation of the chi input element will cause rotation of the chi member and the chi output element;

(e) a phi ring gear journaled in the upstanding portion for rotation about the chi axis and having inwardly directed teeth;

(f) a phi input shaft coupled through gearing to the ring gear to cause rotation of the ring gear whenever the input shaft rotates;

(g) a phi head mounted on the chi member and including an internal tubular worm gear and connected elements journaled for rotation about a phi axis normal to and intersecting the chi axis;

(h) said phi head including a worm selectively engaging the tubular worm gear and mounted on a shaft journaled in the phi head;
(i) a pinion mounted on the phi head shaft and in meshing engagement with the annular ring gear;
(j) eccentric positioning means coupled to the phi worm gear and the phi worm for selectively moving the two into and out of meshing engagement;
(k) a differential mounted in the base of the structure and having a phi odometer drive output shaft;
(l) said differential having an input side, gearing coupling the input side of the differential to the phi ring gear; and,
(m) second power train means connecting the chi member to the input side of the differential whereby rotation of either or both of the phi and chi input shafts will cause rotation of the differential output shaft.

9. A goniostat comprising:
(a) a housing including means for mounting the housing on a diffractometer or the like;
(b) a chi member journalled in the housing for rotation about a chi axis;
(c) a phi member journalled on the chi member for rotation about a phi axis normal to the chi axis;
(d) chi and phi drive means mounted in the housing and respectively connected to the chi and phi members;
(e) chi and phi input elements respectively connected to the chi drive means and the phi drive means;
(f) a phi output means remote from the phi member and coupled respectively to the chi and phi drive means, the phi output means having a single output element; and,
(g) said phi output means driving said phi output element in synchronization with phi member rotation about the phi axis, said output element being rotatable about its own axis and otherwise stationary.

10. A goniostat according to claim 9 in which the chi and phi output shafts are journaled in the said housing and each is rotatable about its own axis in response to rotation of the chi and phi member respectively but are otherwise stationary with respect to the said housing.

11. The device of claim 9 wherein said phi output means is a differential.

12. A goniostat comprising:
(a) a housing having a base including means for mounting the base on an omega member of a diffractometer or the like and an upstanding portion;
(b) a chi member journalled in the upstanding portion for rotation about a chi axis;
(c) chi input and output elements journalled in the housing;
(d) first power train means coupling the chi elements to the chi member whereby rotation of the chi input element will cause rotation of the chi member and the chi output element;
(e) a phi head mounted on the chi member and including connected elements journalled for rotation about a phi axis normal to and intersecting the chi axis;
(f) a phi input shaft and phi input gearing carried by the housing, said phi input shaft being coupled through said gearing to the phi head elements to cause rotation of the phi head elements whenever the input shaft rotates;
(g) a differential mounted in the base of the structure and having a phi output shaft;
(h) said differential having an input side, other gearing coupling the input side of the differential to the phi input gearing; and,
(i) second power train means connecting the chi member to the input side of the differential whereby rotation of either or both of the phi and chi input shafts will cause rotation of the differential output shaft.

13. The device of claim 12 wherein eccentric positioning means is coupled to two gears of said phi input gearing for selectively moving the two into and out of meshing engagement.

14. The device of claim 12 wherein said first power train means includes:
(a) a spring biasing two elements of the train into meshing engagement; and,
(b) an eccentric means interposed between the elements and actuatable to overcome the biasing of the spring and unmesh said elements.

References Cited by the Examiner
UNITED STATES PATENTS 3,105,901  10/63  Ladell _______________ 250—51.5

OTHER REFERENCES

Cole et al.: "Computer-Controlled Diffractometer," the Review of Scientific Instruments, volume 34, No. 8, August 1963, pages 872 to 876.

Intrater et al.: "Goniometer, Full Circle, for Single-Crystal X-Ray Diffraction," the Encyclopedia of X-Rays and Gamma Rays, July 26, 1963, pages 436 and 437.

Mueller et al.: "Full Circle Goniostat for Diffraction Intensity Data," the Review of Scientific Instruments, volume 34, No. 1, January 1963, pages 74 to 76.

RALPH G. NILSON, *Primary Examiner.*